E. WEBER-STIERLIN.
GAS DISTRIBUTING DEVICE.
APPLICATION FILED JULY 7, 1910.
1,003,302.
Patented Sept. 12, 1911.
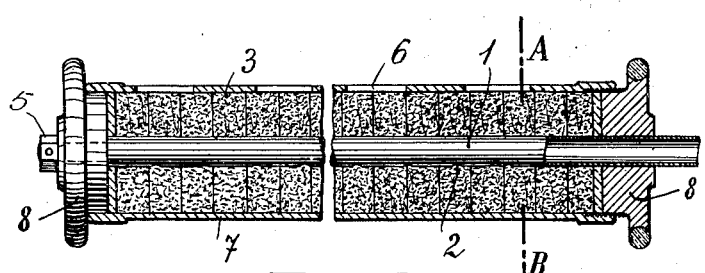
Fig. 1.
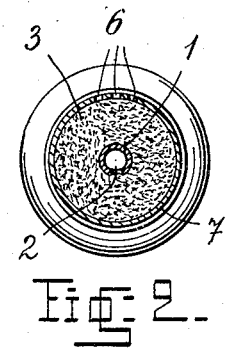
Fig. 2.
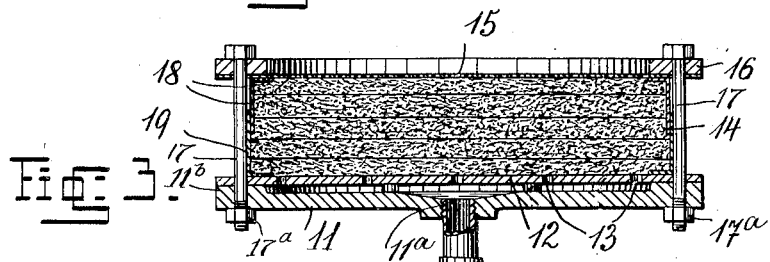
Fig. 3.
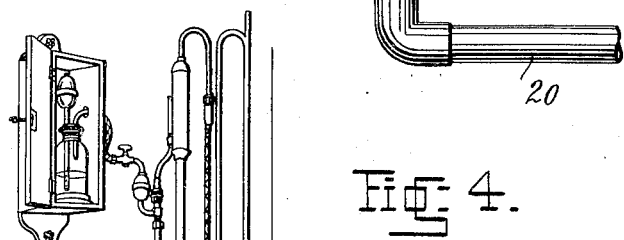
Fig. 4.
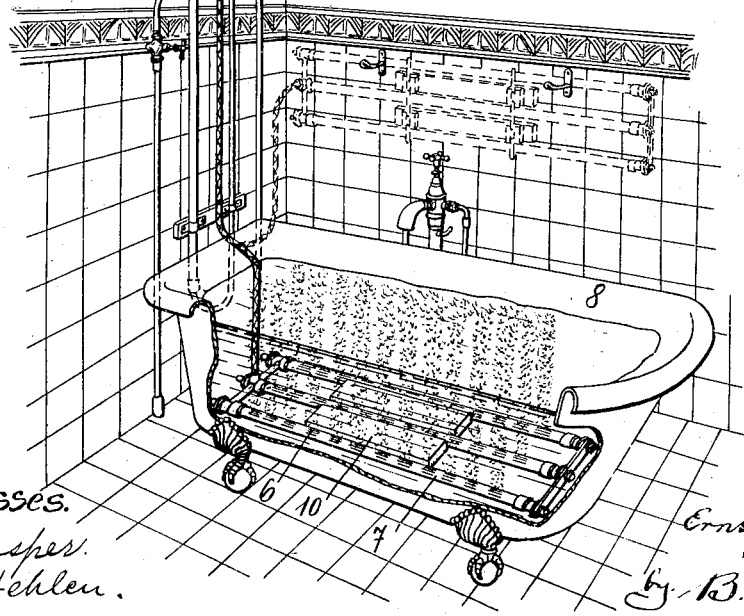
Witnesses.
F. Kasper.
J. E. Fehlen.
Inventor
Ernst Weber-Stierlin
by B. Singer
Atty

UNITED STATES PATENT OFFICE.

ERNST WEBER-STIERLIN, OF ZURICH, SWITZERLAND.

GAS-DISTRIBUTING DEVICE.

1,003,302. Specification of Letters Patent. Patented Sept. 12, 1911.

Application filed July 7, 1910. Serial No. 570,892.

*To all whom it may concern:*

Be it known that I, ERNST WEBER-STIERLIN, engineer, a citizen of the Swiss Confederation, and resident of Forchstrasse 136, Zurich, Switzerland, have invented new and useful Improvements in Gas-Distributing Devices, of which the following is a specification.

My invention relates to apparatus for distributing gas in liquids, devices of which kind are used for regenerating the water in fish receptacles, or for the preparation of baths for the treatment of certain maladies.

An object of my invention is to provide a device with which a great number of very small bubbles can be formed which are of a uniform size.

A further object of my invention is to provide a device which will not deteriorate even after a long use and which will retain its facility for forming bubbles of a small and uniform size.

I attain these objects by compressing a quantity of hair-like material, preferably in layers, in a retainer adapted to contain the material and by forcing the air or gas through the material in such a manner that the air or gas is finely divided and rises in small bubbles, from apertures in the container, through liquid contained in the receptacle in which my device is placed.

In the accompanying drawings, forming a part of this specification,—Figure 1 is a central longitudinal section through a container embodying my invention. Fig. 2 is a sectional view taken on the line A—B of Fig. 1. Fig. 3 is a central vertical section through a modified form of my device. Fig. 4 is a perspective view showing the application of the device disclosed in Fig. 1, arranged in series, and placed in a bath tub, part of the latter being shown in section.

With special reference to Figs. 1 and 2, I provide an inner and outer tube 1 and 7, respectively, arranged concentrically. The space between the tubes is filled with compressed hair-like material 3, preferably arranged in layers diametrically with respect to the tube. The ends of the outer tube are closed by means of threaded plugs 8, which hold the hair-like material 3 within the tube 7, and about the tube 1 under compression, and which compression may be adjusted by turning one of the plugs 8. One end of the tube 1 is closed by means of a plug 5, the other end of which is adapted to be connected to a main, supplying compressed gas, such as air, or carbon dioxid gas. The inner tube is provided, preferably at its under side, with a number of apertures 2 for egress of the gas from the tube. The outer tube 7 is provided, preferably at its upper side with a plurality of slots 6, for egress of the gas from the device. By this preferred arrangement of apertures it will be seen that the gas must pass through a greater section of the hair-like material than if otherwise arranged and upon leaving the device rises vertically, which construction prevents the bubbles forming on the outer walls of the tube 7 and uniting there.

As shown in Fig. 4 the tubes may be arranged in series with a common main serving as the supply pipe to all of the tubes. This main may be flexible in order that the device may be moved from the tub and hung on a rack as shown in dotted lines.

The gas distributing device, as shown in Fig. 3, differs only in its outward appearance, the principle of the device remaining the same. I provide a plate 11 having a threaded opening 11$^a$, by which connection is made to the gas supply pipe 20, and an annular flange 11$^b$. Arranged superjacent to the plate 11, and resting on the flange 11$^a$ thereof, is a plate 12 having a plurality of openings 13.

Retaining means for the hair-like material 14, preferably arranged in layers superjacent to each other, disposed upon the plate 12, is made up of side pieces 18 consisting of angle iron having unequal legs, the longer legs of which are in lateral abutting relation to each other, and disposed upon the short leg of the upper angle iron is a plate 15 having a plurality of openings 18, which forms the top of the retainer. In order to hold the retaining means in place, and to provide means for compressing the material contained therein, a ring 16 is placed above the plate 15 and connected to the plate 11 by means of bolts 17 and nuts 17$^a$. By this construction it will be seen that material contained within the retainer may be compressed or released by turning the nuts 17$^a$, the side of the retainer being collapsible.

The hair-like material, which in fact may be animal hair, used as a filling for the tube does not decay and preserves its elasticity for years. It is essential that the degree of compression of the filling material be as uniform as possible throughout its sectional area. In this connection, I have found it desirable to arrange the hair-like material in layers, compressing each layer in place.

It is to be understood that I do not limit myself to the forms of retaining means shown in the drawings since any combinations of parts which will hold the hair-like material under uniform compression, and the introduction of the gas at such a point that it will be forced through the material before leaving a retainer may be used without detracting from the spirit of my invention.

I claim:—

1. A device for distributing gas through a liquid comprising in combination, an outer tube having openings therein for egress of the gas, an inner delivery tube extending into the outer tube and provided with openings and adapted to be connected with the source of supply, a plurality of diaphragms dividing space between said tubes into a plurality of compartments with bodies of hair between said diaphragms and filling the space between said tubes, and means for compressing and retaining said hair bodies and diaphragms in close relation.

2. A device for distributing gas through a liquid comprising in combination, an outer tube having openings therein for egress of the gas, an inner delivery tube extending into the outer tube and provided with openings for discharge of the gas, a plurality of imperforate diaphragms dividing the space between said tubes into a plurality of compartments with bodies of hair between said diaphragms and filling the space between said tubes, and means for closing one end of said outer tube and compressing the hair bodies and diaphragms therein.

3. A device for distributing gas through liquid comprising in combination, an outer hollow member having openings for egress of the gas, a member adapted for connection with a source of supply of the gas and extending into and delivering to said outer member, a plurality of diaphragms dividing the space between said members into a plurality of compartments with bodies of hair-like material filling the spaces between said members and diaphragms, and means for compressing the material and diaphragms, substantially as and for the purposes set forth.

4. A device for distributing gas through liquid comprising in combination, an outer hollow member having openings for egress of the gas, a member adapted for connection with a source of supply of gas and connected to deliver to said outer member, a plurality of diaphragms dividing said outer member into a plurality of compartments with bodies of hair-like material filling the spaces between said compartments, and means for compressing the material and diaphragms, substantially as and for the purposes set forth.

5. A device for distributing gases in liquids comprising in combination, a tube with slots therein, a second tube, placed inside said tube, with slots adapted to be connected with a gas supply, and compressed fibers between said tubes.

6. A device for distributing gases in liquids comprising in combination, an outer tube with slots therein, means closing the ends of said tube, a second inner tube with slots placed co-centrically within said tube adapted to be connected to a gas supply pipe, and a compressible filling of hair in the space between said tubes.

7. A device for distributing gases in liquids comprising in combination, a retainer having a plurality of apertures formed therein, a member adapted for connection with a source of supply of gas and connected to deliver to said retainer, a filling comprising a plurality of layers of compressed hair-like material disposed within said retainer, and means for uniformly compressing said material with said retainer.

In testimony whereof I affix my signature in presence of two witnesses.

ERNST WEBER-STIERLIN.

Witnesses:
CARL GUBLER,
AUGUST RUEGG.